United States Patent [19]

Küpper et al.

[11] 4,433,099

[45] Feb. 21, 1984

[54] PRODUCTION OF IMPACT-RESISTANT STYRENE POLYMERS

[75] Inventors: Friedrich-Wilhelm Küpper; Günter Padberg, both of Marl; Ulrich Reichert, Haltern; Walter Trautmann, Marl, all of Fed. Rep. of Germany

[73] Assignee: Chemische Werke Hüls AG, Marl, Fed. Rep. of Germany

[21] Appl. No.: 252,628

[22] Filed: Apr. 9, 1981

[30] Foreign Application Priority Data

May 16, 1980 [DE] Fed. Rep. of Germany ....... 3018643

[51] Int. Cl.$^3$ .......................................... C08F 279/02
[52] U.S. Cl. ...................................... 525/53; 525/316
[58] Field of Search ................................. 525/316, 53

[56] References Cited

U.S. PATENT DOCUMENTS

| | | | |
|---|---|---|---|
| 3,511,895 | 5/1970 | Kydonieus et al. | 525/98 |
| 3,883,616 | 5/1975 | Hozumi et al. | 525/316 |
| 3,903,202 | 9/1975 | Carter | 525/53 |
| 3,945,976 | 3/1976 | McCurdy et al. | 525/316 |
| 3,996,311 | 12/1976 | Westphal et al. | 525/316 |
| 4,011,284 | 3/1977 | Gawne | 525/53 |
| 4,255,315 | 3/1981 | Anspon | 525/316 |
| 4,282,334 | 8/1981 | Walter | 525/53 |

OTHER PUBLICATIONS

Modern Plastics, Donald F. Doehnert et al., "Evaluation of Organic Peroxides from Halflife" 2/59, pp. 142–146.

*Primary Examiner*—Paul R. Michl
*Attorney, Agent, or Firm*—Wells & Wells

[57] ABSTRACT

Impact-resistant modified styrene polymers having the characteristics: molecular weight $M_v$ 150,000 to 170,000; gel content exceeding 22%; degree of swelling of 11.5 to 13.5 and a mean gel particle diameter of 1.7 to 4.5 microns are produced by continuously polymerizing a styrene solution of polybutadiene, possibly in the presence of diluents, by means of a cascade consisting of at least three continuous stirred tank reactors, at rising temperatures and in the presence of organic peroxide initiators. The process steps are carried out as follows:

(a) in a first continuous stirred tank reactor, a continuously introduced solution of styrene containing from 8 to 10.5% by weight (referred to the amount of input styrene) of polybutadiene rubber with more than 85% of a cis-1,4-structure, is polymerized in the presence of 1 to 7 m moles of an initiator per kilogram of styrene, where the initiator concentration is based upon a peroxide group or an equivalent amount of such with several peroxide groups having a half-life time exceeding 5 and less than 40 hours at 100° C. (measured in benzene), for a residence time of 0.8 to 1.6 hours with shearing at temperatures of about 110° to 140° C., to a solid content of about 28 to 42% by weight;

(b) polymerization proceeds after transfer into one, two or three further agitation vessels at temperatures of about 130° to 160° C., for a total residence time of about 1.0 to 1.8 hours, to a solid content of about 60 to 73% by weight;

(c) polymerization proceeds after transfer into a further continuous stirred tank reactor at a temperature of about 150° to 175° C. and a dwell time of about 1.2 to 2.5 hours up to a solid content exceeding 75% by weight and a residual initiator content less than 1% by weight of the original amount; and (d) the substance is rid of volatile components at temperatures less than 260° C. under reduced pressure.

4 Claims, No Drawings

PRODUCTION OF IMPACT-RESISTANT STYRENE POLYMERS

CROSS REFERENCE TO RELATED APPLICATION

Applicants claim priority under 35 USC 119 for application Ser. No. P 30 18 643.7, filed May 16, 1980 in the patent office of the Federal Republic of Germany.

BACKGROUND OF THE INVENTION

The field of the invention is synthetic resins comprising a rubber and an aromatic resin and the invention is particularly concerned with the production of impact-resistant styrene polymers by polymerizing the styrene in the presence of rubber.

Among the prior art methods, continuously implemented bulk and solution polymerizations have become industrially significant.

The state of the art of polymerizing styrene in the presence of rubber may be ascertained by reference to U.S. Pat. Nos. 3,395,746; 3,428,712; 3,511,895; 3,513,145; 4,042,768; 4,081,497; 4,144,204; 4,153,501 and 4,185,049; British Pat. Nos. 1,213,467; 1,547,048; 1,555,725 and 1,576,722; West German published applications 2,017,277 and 2,630,929, the disclosures of which are incorporated herein.

The polymerization takes place in several stages, where in the first polymerization state or prepolymerization stage, the styrene rubber solution, possibly also containing an inert diluent, is polymerized with shearing applied until the polymer is converted beyond phase reversal and then polymerization is continued to completion to the desired styrene conversion with less shear or without any shear at all. The methods conventional in the prior art differ with respect to the stages following the first stage, essentially in that the last stage is carried out in flow reactors, for instance tubular reactors, with plug flow features as disclosed in U.S. Pat. Nos. 2,694,692; 3,243,481; and 4,144,204; British Pat. Nos. 1,155,725 and 1,576,722; and German published application 2,630,929. The other method is a continuous stirred tank reactor cascade consisting of at least three agitation vessels as disclosed in U.S. Pat. No. 3,511,895.

The products obtained by these different prior art polymerization methods differ in the structure of the gel phase, as shown by electron-microscopic examination.

It is furthermore known that the properties of the final products essentially are codetermined by the particle sizes of the soft component portion (particle size and size distribution of the dispersed rubber phase) and by the gel portion of the soft component consisting of the grafted rubber particles and the enclosed polystyrene. The gel portion depends on the kind and the amount of rubber, the polymerization temperature, the agitation conditions applied and the kind and concentration of any added initiator. It is known furthermore that the degree of swelling of the soft component must be accounted for, since this is a measure of the crosslinking density of the gel phase. Lastly the mechanical and thermal properties of the hard component (polystyrene) must be considered. These mechanical and thermal properties are determined by the molecular weight and the molecular weight distribution. In this respect, applicants refer to the comprehensive publications by Willersinn, Makromolekulare Chemie 101 (1967), pp. 296–319; Fischer, Die Angewandte Makromolekulare Chemie 33, (1973) pp. 35–74; Applied Polymer Symposium 15 (1970) p. 74(d); Freeguard, Brit. Polymer J. 6, (1974) pp. 205–228; Stein, Angewandte Makromolekulare Chemie 38 (1974), p. 67, and furthermore British Pat. No. 1,175,262. It is known too that these conditions depend on how the process is being carried out, i.e., they are process specific.

All bulk polymerization methods require removing a substantial amount of generated heat within a short time if high space-time-yields are to be achieved. The space-time yields in these polymerizations can be increased among other ways by adding organic peroxide initiators. When initiators are used in these continuous methods, the polymerization must be monitored, and care must be taken that on account of too slow a dissociation, fairly substantial amounts of unused initiator can collect and this collection of initiator will spontaneously decompose when there is a rise in temperature due for instance, to inadequate heat removal. Therefore, initiators frequently are undesired in continuous bulk methods, as disclosed in British Pat. No. 1,547,048 and U.S. Pat. No. 4,042,768.

An impact-resistant modified polystyrene can be produced at lower technical requirements and costs than in the flow reactors cited above with plug flow features, using to that end a cascade of several continuous stirred tank reactors that the heat removal and hence the control of the polymerization temperature do not take place through complex means installed in the reactors that would require substantial control costs and in the case of a malfunction could only be repaired with great difficulty.

On the other hand, the state of the art teaches that the use of cascades of continuous stirred tank reactors results in lesser product quality as disclosed in German published application 2,017,277 and U.S. Pat. No. 4,081,497.

SUMMARY OF THE INVENTION

Having in mind the limitations of the prior art it is an object of the present invention to manufacture a easily flowing, impact-resistant polystyrene which is undegraded in its mechanical properties.

Another object of the present invention is the use of a cascade of continuous stirred tank reactors in a continuous process.

A particular object of the present invention is a process for the production of impact-resistant, modified styrene polymers by continuously polymerizing a styrene solution of polybutadiene, possibly in the presence of diluents, using a cascade of at least three agitation vessels, at rising temperatures and in the presence of peroxide initiators where the product has the following characteristics:

molecular weight $M_V = 150,000$ to $170,000$;
gel content exceeding 22%;
degree of swelling = 11 to 13.5; and
mean gel particle diameter = 1.7 to 4.5 microns.

According to the present invention:

(a) in a first agitation vessel, a continuously introduced styrene solution containing 8 to 10.5% by weight (referred to the input of styrene) of polybutadiene rubber containing more than 85% of the cis-1,4-structure is polymerized in the presence of 1 to 7 m moles of initiator per kg of styrene, where the initiator has one peroxide group or an equivalent amount of an initiator with several peroxide groups having a half-life time exceeding 5 and less than 40 hours at 100° C. (measured in benzene) for a residence time of 0.8 to 1.6 hours and with shearing at temperatures from 110° to 140° C. until a solid content of 28 to 42% by weight is reached;

(b) after transfer into one, two or three further agitation vessels, the polymerization proceeds at temperatures of 130° to 160° C. for a total residence time of 1.0 to 1.8 hours and until a solid content of 60 to 73% by weight is reached;

(c) after transfer to a further agitation vessel, the polymerization proceeds at a temperature of 150° to 175° C. and a residence time of 1.2 to 2.5 hours, until solid content exceeding 75% by weight is reached and to a residual initiator content less than 1% by weight of the original amount; and (d) the substance is freed from volatile components under reduced pressure and at temperatures less than 260° C.

The product is obtained as a polymer melt and—after passing suitable apparatus and cooling—as solid granules of rubber-modified polystyrene resin. This resin can be used for molding and extrusion applications in the conventional way, using the known machinery and a melt of this newly developed, more easily flowing resin.

DESCRIPTION OF THE PREFERRED EMBODIMENTS

The present invention cannot be made obvious by the state of the art such as disclosed in U.S. Pat. No. 3,511,895. First, U.S. Pat. No. 3,511,895 relates essentially to a method for the production of styrene polymers containing rubber and modified with acrylonitrile. An initiator may be added in the third agitation vessel for solid contents in excess of 55% by weight, in order to lower the molecular weight of the polymer formed. The initiator residues are supposed to be destroyed after they leave this agitation vessel. As the comparison tests of the present invention show, a high residual initiator content after the last stage results in failure.

The products obtained, however, evince a molecular weight calculated from the reduced viscosities and measured in methylethylketone, which substantially exceeds $M_v = 170,000$ (Bull. Soc. Chim. Belges 63 [1954]285), and the rubber phase is strongly crosslinked. Lastly, the gel particle diameter for this method of the state of the art is less than 2 microns for 80% of them. No information is provided regarding the amount of the residual initiator content, even though the specification states that unaltered initiators are damaging and recognizes that there is significance in the crosslinking of the rubber phase by the free radicals. There is no statement concerning the required degree of crosslinking expressed by the degree of swelling.

The addition of initiators according to the present invention to the last agitation vessel in the amounts of the method of U.S. Pat. No. 3,511,895 fails to provide the desired result, because products with too high a crosslinking of the rubber phase and with poorer mechanical properties are obtained.

When the process conditions in conformity with the present invention are selected, for instance the selection of the special initiators, the addition of these initiators at the beginning of the polymerization, slight residual initiator content upon discharge from the last agitation vessel and the combination with the selected temperature intervals and the selected residence times, products which melt, flow easily, with the desired low molecular weights and nevertheless good mechanical properties are achieved.

Lastly, the state of the art teaches that for a high rubber content, the products obtained will be more difficult to process. Thus, U.S. Pat. No. 3,428,712 describes a method of preparing easily flowing rubber rich polymers with good impact strength, obtained by lowering the molecular weight of the matrix. However, this reference specifically states that the lowering of the molecular weight entails a degradation in mechanical strength and this is in agreement with the teaching of U.S. Pat. No. 4,185,049, namely that the low molecular part of the polystyrene molecular weight distribution lowers the impact strength. This drawback can only be eliminated by increased grafting of the rubber component, so long as the molecular weight of the matrix does not drop below 170,000.

In view of these contradictory views of the state of the art, it was not obvious that the steps defined in the claims of the present invention would achieve products of low molecular weight without incurring degradation of the mechanical properties.

Suitable organic peroxide initiators for the present invention are tert.-butyl-perbenzoate, di-tert.-butyl-diperphthalate, tert.-butyl-per-isononate, tert.-butyl-peracetate, 2,5-dimethylhexane-2,5-diperbenzoate or their mixtures and tert.-butyl-perbenzoate is preferred. Preferably, the half-value time for these organic peroxide initiators at 100° C. (measured in benzene) is 15 to 35 hours.

The amount of initiator cannot be increased arbitrarily. Arbitrary increase is made impossible by the resulting increase in the rate of reaction and the released heat of reaction, also the lowering of the matrix molecular weights and the increased crosslinking of the gel phase. Preferably the amount of initiator is about 2.0 to 4.5 m moles per kg of styrene.

The polybutadiene rubber, preferably with more than 96% in cis-1,4-structure, preferably is contained in amounts of about 8.5 to 10.0% by weight in the styrene monomer.

Preferably, the temperatures in the first agitation vessel are about 120° to 130° C. and the corresponding residence times are from about 1.0 to 1.2 hours, and in the one to three ensuing agitation vessels, about 140° to 155° C. with a total residence time of about 1.1 to 1.4 hours, and in the last agitation vessel, about 155° to 165° C. and about 1.4 to 1.9 hours. Preferably, one agitation vessel is used in stage (b), whereby the cascade consists of at least three and at most five agitation vessels. Directly before stage (d) and before the removal of the volatile components, the degree of conversion of the styrene may be increased by temperatures in excess of 170° C.

Care should be taken that the crosslinking of the gel phase be moderate enough that the swelling degree be no less than 20, preferably no less than 25 when the reaction mixture is discharged from the last agitation vessel.

Suitable diluents are the known inert ones such as ethylbenzene, toluene or xylene, preferably xylene and these may be present in conventional proportions of 1 to 15, preferably 5 to 10% by weight referred to the styrene/rubber solution. If desired, conventional additives such as paraffin oil, waxes, esters of long chain aliphatic alcohols, antioxidants and fillers may be added according to the state of the art.

Suitable apparatus for the reprocessing of the polymers are such which permit removing any solvent present and the monomer which is unconverted as far as the last reactor output in a least damaging manner. For instance, helical and expansion evaporation apparatus are suitable which correspond to the state of the art and permit achievement of the desired residual monomer contents as disclosed in British Pat. No. 1,213,467 and U.S. Pat. Nos. 3,395,746; 3,513,145 and 4,153,501.

The molecular weight $M_v$ is determined by viscometric measurements (measured in toluene at concentrations of 0.5 g/100 cm$^3$ (per C. Rossi, Consiglio Nationalle Delle Ricerche, Rome, 1963, p. 153). A prior separation of the gel takes place in this determination of the molecular weight.

Preferably, the gel content is more than 24% by weight and the degree of swelling determined in toluene preferably exceeds 11.5 at 20° C. "Degree of swelling" means the weight ratio of the wet gel (swollen in toluene, until the toluene content reaches an equilibrium value) and of the dry gel (freed from toluene under a vacuum of 10 mm at 60° C. for 3 hours). Preferably, the average gel particle diameter is 2.0 to 3.0 microns (measured in dimethylformamide per D. E. James, Polym. Eng. Sci. 8 [1968]241).

The easily flowing, impact-resistant styrene polymers obtained are especially suited for processing in the injection and extrusion modes.

EXAMPLES

A solution consisting of 10 kg of polybutadiene with greater than 97% of cis-double bonds (Mooney viscosity ML 4≈40), 2.5 kg of paraffin oil, 12.5 kg of toluene and, 100 kg of monomeric styrene are placed per hour in a first agitation vessel, together with changing amounts of an organic peroxide initiator, the styrene rubber solution having been preheated to a temperature of about 65° to 85° C.

The angular speed of the stirrer is set so that the final products have a particle size of 1.7 to 4.5 microns, preferably 2 to 3 microns with the agitator stirring more rapidly in the first vessel than in the ensuing ones. The partly polymerized solution discharging from the first agitation vessel is then further polymerized in the second vessel, and lastly in a third agitation vessel to completion. The particular temperatures and solid contents are summarized in the table below.

The amount of initiator as yet undissociated at the discharge of each reactor is calculated as follows:

$$I_{out}=I_{in}/[1+k_i\tau_i],$$

where $\tau_i$ is the residence time in the reactor i and $k_i$ is the dissociation constant of the initiator, this constant being reactor-temperature dependent. The values as measured in benzene are used for $k_i$.

The solution discharging from the third agitation vessel is concentrated at temperatures of 235° to 250° C. under reduced pressure to a solid content in excess of 92%, and then the polymer melt is reduced under further reduced pressure and expansion evaporation at temperatures of 255° to 240° C. to a final monomer content less than or equal to 0.06%. The total residence time in the degassing line should be kept within 30 minutes.

Examples (a) through (c) listed in the following table are comparison tests. The examples (d) through (i) are examples according to the present invention.

Table 2 lists the mechanical values.

The notch-impact strength (per Charpy) is carried out per DIN (German Industrial Standard) 53 453 on injection-molded bars, the determination of the VICAT temperature (VST/B/50) per DIN 53 460 and that of the flowability per DIN 53 735. The puncture work was performed on foils per DIN 53 473 in the falling bolt test.

TABLE 1

| Example No. | Initiator m mol/kg styrene | reactor 1 Temp. (°C.) | reactor 1 $\tau$ (Std.) h | reactor 1 Solid (%) | reactor 2 Temp. (°C.) | reactor 2 $\tau$ (Std.) h | reactor 2 Solid (%) | reactor 3 Temp. (°C.) | reactor 3 $\tau$ (Std.) h | reactor 3 Solid (%) |
|---|---|---|---|---|---|---|---|---|---|---|
| a | DTBP 2.1 | 131 | 1.4 | 33 | 145 | 1.4 | 68 | 145 | 1.7 | 75 |
| b | DTBP 2.1 | 131 | 1.4 | 30 | 160 | 1.3 | 78 | 160 | 1.4 | 81 |
| c | DTBP 2.1 | 131 | 1.4 | 30 | 140 | 1.3 | 60 | 170 | 1.4 | 79 |
| d | TBPB 2.2 | 127 | 1.1 | 34 | 156 | 1.1 | 68 | 160 | 1.7 | 79 |
| e | TBPB 2.2 | 134 | 1.1 | 40 | 153 | 1.1 | 62 | 165 | 1.7 | 83 |
| f | TBPB 3.3 | 126 | 1.4 | 40 | 146 | 1.3 | 64 | 170 | 1.7 | 81 |
| g | TBPB 3.3 | 124 | 1.1 | 35 | 148 | 1.1 | 70 | 160 | 1.7 | 78 |
| h | TBPB 3.3 | 127 | 1.1 | 34 | 153 | 1.1 | 69 | 165 | 1.7 | 78 |
| i | TBPB 4.5 | 120 | 1.1 | 32 | 142 | 1.1 | 72 | 160 | 1.7 | 83 |

| Example No. | reactor 3 Degree Swell | Undissociated initiator from reactor 3 (%) | Final Product $M_y \cdot 10^3$ | Final Product Gel (%) | Final Product Degree Swell | Final Product Diameter ($\mu$m)+ |
|---|---|---|---|---|---|---|
| a | 25 | 23.0 | 194 | 25.0 | 10.7 | 3.2 |
| b | 15 | 3.9 | 153 | 26.0 | 9.7 | 3.9 |
| c | 17 | 5.3 | 165 | 27.2 | 9.7 | 3.2 |
| d | 29 | <0.1 | 159 | 24.2 | 11.6 | 2.5 |
| e | 24 | 0.1 | 168 | 26.5 | 10.4 | 4.2 |
| f | 22 | <0.1 | 163 | 23.8 | 11.7 | 4.3 |
| g | 25 | 0.1 | 165 | 26.4 | 11.6 | 2.0 |
| h | 24 | <0.1 | 153 | 26.0 | 11.0 | 2.6 |
| i | 24 | 0.3 | 152 | 27.1 | 11.2 | 2.5 |

DTBP = Di-tert.-butylperoxide
TBPB = Tert.-butylperbenzoate
+mean diameter of gel particles

TABLE 2

| Example No. | I5-value (DIN 53 735) g 10 Min. | Vicat (DIN 53,460) (°C.) | Notch Impact Strength (KJ/mm$^2$) at 23° C. | Notch Impact Strength (DIN 53 735) at −40° C. | Foil Punch-Through Test (DIN 53,473) (J) |
|---|---|---|---|---|---|
| a | 2.3 | 90 | 9.0 | 3.0 | 7.2 |
| b | 6.4 | 90 | 6.3 | — | 5.9 |
| c | 4.8 | 88 | 6.9 | 4.9 | 5.1 |
| d | 4.6 | 91 | 9.8 | 3.0 | 9.4 |
| e | 3.3 | 90 | 7.5 | 4.6 | 7.7 |
| f | 3.8 | 91 | 7.5 | 4.2 | 7.0 |
| g | 3.7 | 92 | 10.9 | 5.5 | 10.0 |
| h | 5.0 | 90 | 7.7 | 3.5 | 7.7 |
| i | 6.1 | 90 | 9.6 | 3.7 | 9.9 |

We claim:

1. A method of producing impact-resistant modified styrene polymers having the characteristics: molecular weight $M_y$ 150,000 to 170,000; gel content exceeding 22%, and a mean gel particle diameter of 1.7 to 4.5 microns, by continuously polymerizing a styrene solution of polybutadiene, possibly in the presence of diluents, in a cascade of at least three agitation vessels, at rising temperatures and in the presence of a peroxide initiator comprising:

(a) continuously introducing a solution of styrene consisting essentially of from about 8 to 10.5% by weight of polybutadiene rubber, based on said styrene and having more than 85% of a cis-1,4-structure into a first continuous stirred tank reactor, polymerizing said solution in the presence of about 1 to 7 m moles of an organic peroxide initiator having a single peroxide group or an equivalent amount of an organic peroxide initiator having a plurality of peroxide groups, said peroxide initiator having a half-life time exceeding 5 and less than 40 hours as measured in benzene at 100° C., said polymerizing being carried out for a residence time of about 0.8 to 1.6 hours with shearing agitation at temperatures of about 110° to 140° C., said dwell time being sufficient to produce a solid content of about 28 to 40% by weight;

(b) transferring the product of step (a) into at least one, but less than four additional continuous stirred tank reactors and continuing the polymerization at temperatures of about 130° to 160° C. for an additional residence time of about 1.0 to 1.8 hours in step (b) sufficient to produce a solid content of 60 to 73% by weight, (c) transferring the product of step (b) into a further continuous stirred tank reactor and continuing the polymerization at a temperature of about 150° to 175° C. for an additional residence time of about 1.2 to 2.5 hours sufficient to produce a solid content exceeding 75% by weight and a residual organic peroxide initiator content less than 1% of the original amount; and (d) removing volatile components at temperatures less than 260° C. under reduced pressures and recovering a product.

2. The method of claim 1, wherein said organic peroxide initiator is selected from the group consisting of tert.-butyl-perbenzoate, di-tert.-butyl-di-perphthalate, tert.-butyl-per-isononate, tert.-butyl-peracetate, 2,5-dimethylhexane-2,5-diperbenzoate, and mixtures thereof.

3. The method of claim 2, wherein said organic peroxide initiator is tert.-butyl-perbenzoate.

4. The method of claim 3, wherein prior to step (d), the degree of conversion of the styrene is further increased first at temperatures above 170° C.

* * * * *